(12) United States Patent
Sudau et al.

(10) Patent No.: US 6,435,998 B1
(45) Date of Patent: Aug. 20, 2002

(54) DRIVE TRAIN WITH RIGIDITY DEPENDENT ON ROTATIONAL SPEED

(75) Inventors: Jörg Sudau; Erwin Wack, both of Niederwerrn; Peter Frey, Gerolzhofen, all of (DE)

(73) Assignee: Mannesmann, Sachs AG, Schweinfurt (DE)

(*) Notice: Subject to any disclaimer, the term of this patent is extended or adjusted under 35 U.S.C. 154(b) by 0 days.

(21) Appl. No.: 09/592,234

(22) Filed: Jun. 12, 2000

(30) Foreign Application Priority Data

Jun. 11, 1999 (DE) .......................... 199 26 696

(51) Int. Cl.$^7$ .............................. F16D 3/14; F16F 15/31
(52) U.S. Cl. ........................ 475/47; 475/255; 475/347; 74/574; 192/3.28
(58) Field of Search ........................... 475/47, 59, 255, 475/347; 192/3.28, 3.29, 3.31; 74/574

(56) References Cited

U.S. PATENT DOCUMENTS

| 4,867,290 A | * | 9/1989 | Macdonald et al. | ........ 192/203 |
| 4,889,012 A | * | 12/1989 | Dull | ........................ 192/3.28 |
| 5,634,866 A | * | 6/1997 | Sudau | .................... 192/70.17 |
| 6,102,174 A | * | 8/2000 | Sasse | ........................ 192/3.25 |
| 6,126,568 A | * | 10/2000 | Sudau | ........................ 192/212 |

FOREIGN PATENT DOCUMENTS

| DE | 42 00 174 | 8/1992 | ............ F16F/15/30 |
| DE | 44 44 196 | 6/1995 | ............ F16D/13/60 |
| DE | 197 26 477 | 12/1998 | ............ F16F/15/12 |
| EP | 0 306 169 | 8/1988 | ........... F16H/45/02 |

* cited by examiner

Primary Examiner—Charles A Marmor
Assistant Examiner—Ankur Parekh
(74) Attorney, Agent, or Firm—Cohen, Pontani, Lieberman & Pavane (57) ABSTRACT

A drive train of a motor vehicle includes a gear arrangement with at least two gear elements moveable relative to one another acts in a torque transmission path between an internal combustion engine and a transmission. The gear arrangement being connected between a drive-side flywheel mass and a gear-side flywheel mass. The gear arrangement includes at least one additional mass having a center of gravity ($S_p$) which is displaceable radially in relation to an axis of rotation (D) of the torque transmission path as a function of a relative position of the at least two gear elements. In the event of a change in the relative rotary angle between the flywheel masses, a moment of inertia of the torque transmission path also changes, so that there is no definite resonant point and the torque transmission path takes effect as a self-steadying system. Furthermore, the additional mass may be arranged to generate a centrifugally dependent return force directed toward a specific relative rotary angle position. The force acts between two rotary parts rotatable at least to a restricted extent relative to one another and located in the torque transmission path. The specific relative rotary angle position lies between two relative rotary angle boundary positions delimiting a relative rotary angle range of the rotary parts. The gear arrangement may be arranged in a two-mass flywheel or a hydrodynamic clutch device in the motor vehicle drive train.

40 Claims, 6 Drawing Sheets

DRIVE TRAIN WITH RIGIDITY DEPENDENT ON ROTATIONAL SPEED

BACKGROUND OF THE INVENTION

1. Field of the Invention

The present invention relates to a drive train of a motor vehicle with an internal combustion engine, a transmission and a flywheel mass arrangement assigned to a torque transmission path between the internal combustion engine and the transmission, the flywheel mass arrangement has a drive-side flywheel mass assigned to a driven shaft of the internal combustion engine, a transmission-side flywheel mass assigned to an input shaft of the transmission, and a gear arrangement which is connected between the two flywheel masses which are rotatable at least to a restricted extent relative to one another or between part flywheel masses thereof which are rotatable at least to a restricted extent relative to one another, the gear arrangement is effective in at least one operating state for transmitting at least part of a torque flow between the internal combustion engine and the transmission. The gear arrangement includes at least one planet wheel which is coupled via a meshed engagement with a sun wheel or a ring wheel and is rotatable at least to a restricted extent about a planet wheel axis. The planet wheel has at least one rotational additional mass, the center of gravity of which is offset relative to an axis of rotation assigned to said additional mass, the gear arrangement converting a relative rotation of the two flywheel masses or part flywheel masses into a rotation of the additional mass about the axis of rotation assigned to the latter, with the center of gravity being displaced radially in relation to a flywheel mass axis of rotation.

2. Description of the Related Art

To improve the dynamic behavior of the drive train of motor vehicles, torsional vibration dampers are arranged in the torque transmission path between the internal combustion engine and the transmission and recently are often designed as so-called two-mass flywheels. In the latter case, dividing the flywheel mass into two flywheel masses ensures that resonant frequencies of the gear and of the drive train are well below the frequencies of vibrations emanating from the internal combustion engine (engine). This avoids resonances which may lead to noises, such as gear rattling and body drumming.

In the design of the torsional vibration damper, if appropriate the two-mass flywheel, it is often a conflict of aims as regards the resulting rigidity of the torque transmission path. Thus, a low torsional rigidity, that is to say a low value of the c-value usually described in terms of Nm/degrees would be advantageous for low rotational speeds so that the engine could be started with as little noise as possible. By contrast, a higher torsional rigidity should be ensured at higher rotational speeds so that the maximum torque of the internal combustion engine may be covered.

Conventional torsional vibration dampers usually operate with the same c-value over the entire rotational speed range. As a result, these conventional torsional vibration dampers are too rigid under some circumstances such as at low rotational speeds where the internal combustion engine can still exert a little torque.

A two-mass flywheel is disclosed in German reference DE 42 00 174 A1 in which a primary-side flywheel mass and a secondary-side flywheel mass are coupled via toggle lever arrangement. A mass accumulation which generates between the flywheel masses a centrifugally induced return force which increases with a rotational speed of the two-mass flywheel is provided proximate a pivot bearing between a primary-side lever and a secondary-side lever. The coupling of the flywheel masses via the toggle levers leads to an inertia matrix which defines the dynamic properties of the two-mass flywheel and has matrix elements which are dependent on a relative rotary angle of the flywheel masses. This arrangement also leads to a rigidity which is undefined at zero rotational speed from which nndesirable effects may consequently arise such as, for example, disturbing noises when the engine is started.

Another two-mass flywheel is disclosed in German reference DE 197 26 477 A1 in which a gear arrangement and a torsion damper spring arrangement each have a torque-transmitting effect between a primary flywheel and a secondary flywheel rotatable to a restricted extent relative to the latter. The gear arrangement comprises a plurality of planet wheels in a meshed engagement with a ring wheel fixed in terms of rotation relative to the secondary flywheel mass. Each of the planet wheels are assigned at least one additional mass and arranged so that the center of gravity of the at least one additional mass is displaceable radially in relation to an axis of rotation of the two-mass flywheel as a function of a relative rotary position of the ring wheel and of the planet wheel carrier to change a moment of inertia of the two-mass flywheel. This arrangement of a two-mass flywheel takes effect as a selfsteadying system since there is no definite resonant point.

The reference DE 197 26 477 A1 does not mention centrifugally induced return forces acting on the two flywheel masses. However, an analysis of the system disclosed in FIG. 1 of DE 197 26 477 A1 reveals that a centrifugally induced return force increasing with a rotational speed of the two-mass flywheel occurs at all events and takes effect between the primary flywheel mass having the planet wheel carrier and the secondary flywheel mass connected fixedly in terms of rotation to the ring wheel. Whether this centrifugally dependent return force is at all relevant, as compared with a spring arrangement acting between the two flywheel masses, cannot be inferred from the preliminary publication because of a lack of information on the spring forces in the masses. As far as information regarding the different embodiments disclosed in DE 197 26 477 A1 together with the information on the relative angles of rotation between the two flywheels applies to the arrangement of the additional masses to the planet wheels, the arrangement is such that the return force acts on both sides of an unstable intermediate relative rotary angle position of equilibrium, which lies between two relative rotary angle boundary positions delimiting a relative rotary angle range of the flywheel masses, in the direction of the respective nearer relative rotary angle boundary position. It follows from this that the spring arrangement acting between the flywheel masses is required and, moreover, must have a sufficiently high spring force, since otherwise, at least at high rotational speeds, there is the risk that the two flywheel masses may assume a relative rotary position corresponding to the relative rotary angle boundary positions and torsional vibrations may correspondingly be damped at most only incompletely.

A torque converter with a planetary gear which serves for coupling a turbine wheel and a piston of a bridging clutch is known from European Patent No. 0 306 169 B1.

SUMMARY OF THE INVENTION

The object of the present invention is to provide a drive train in which the torque transmission path has lower effective rigidity in a range of lower rotational speeds than in a range of higher rotational speeds so that an internal combustion engine can be started with as little noise as possible and a maximum drive torque capable of being exerted by the internal combustion engine may be conducted by the drive train.

To achieve this object, a drive train of a motor vehicle with an internal combustion engine, a transmission and a flywheel mass arrangement assigned to a torque transmission path between the internal combustion engine and the transmission is provided in which the flywheel mass arrangement has a drive-side flywheel mass assigned to a driven shaft of the internal combustion engine, a transmission-side flywheel mass assigned to an input shaft of the transmission, and a gear arrangement which is connected between the two flywheel masses which are rotatable at least to a restricted extent relative to one another or between part flywheel masses thereof which are rotatable at least to a restricted extent relative to one another, the gear arrangement is effective in at least one operating state for transmitting at least part of a torque flow between the internal combustion engine and the transmission. The gear arrangement includes at least one planet wheel which is coupled via a meshed engagement with a sun wheel or a ring wheel and is rotatable at least to a restricted extent about a planet wheel axis. The planet wheel has at least one rotational additional mass, the center of gravity of which is offset relative to an axis of rotation assigned to said additional mass, the gear arrangement converting a relative rotation of the two flywheel masses or part flywheel masses into a rotation of the additional mass about the axis of rotation assigned to the latter, with the center of gravity being displaced radially in relation to a flywheel mass axis of rotation.

The additional mass is arranged on the planet wheel such that, at least in the operating state, in a relative rotary angle range of the two flywheel masses or part flywheel masses a centrifugally induced return force increasing with a rotational speed of the flywheel mass arrangement and acting on the flywheel masses or part flywheel masses occurs in the direction of a first relative rotary angle position of the two flywheel masses or part flywheel masses which lies between two relative rotary angle boundary positions delimiting the relative rotary angle range.

In addition to the centrifugally dependent return force, an elastic return force exerted by torsion damping springs or the like may also be provided between the flywheel masses or part flywheel masses. If torsion damping springs are provided, then the centrifugally induced return force should be sufficiently high, as compared with the elastic return force exerted by the torsion damping springs to influence the effective rigidity appreciably and to achieve a sufficient increase in rigidity at least at higher rotational speeds. However, since the first relative rotary angle position, which is preferably independent of the rotational speed, lies between the relative rotary angle boundary positions, the torsion spring arrangement or the like acting between the flywheel masses or part flywheel masses may be dispensed with completely, without any losses in the damping of torsional vibrations and even without the fear that the drive-side and the transmission-side flywheel mass will come into rotational abutment along the lines of action as a single flywheel mass system, in the relative rotary angle boundary position.

In one embodiment of the present invention, at least one additional mass may be formed by the mass of a respective planet wheel itself. Alternatively or additionally, at least one additional mass may be formed by the mass of an additional wheel assigned to a respective planet wheel and in meshed engagement with the latter.

There may be arranged in the torque transmission path between the internal combustion engine and the gear a two-mass flywheel which comprises a primary flywheel assigned to the drive-side flywheel mass and a secondary flywheel assigned to the transmission-side flywheel mass. The secondary flywheel may have frictional surfaces of a friction clutch device assigned to the flywheel.

Alternatively, a hydrodynamic clutch device such as a hydraulic clutch or a torque converter may be arranged in the torque transmission path between the internal combustion engine and the gear. The hydrodynamic clutch device comprises a housing and a hydrodynamic circuit formed in the housing. The housing may be arranged to comprise part of the drive-side flywheel mass. Furthermore, a turbine blade arrangement of a turbine wheel of the hydrodynamic circuit may be arranged to comprise part of either the drive-side flywheel mass or the gear-side flywheel mass.

Preferably, the hydrodynamic clutch device has a bridging clutch. If the turbine blade arrangement is part of the drive-side flywheel mass, the turbine blade arrangement is directly couplable via the bridging clutch to the drive-side flywheel mass comprising the housing (when the bridging clutch is in the engaged state). With the bridging clutch disengaged, the turbine blade arrangement is coupled indirectly to the drive-side flywheel mass, specifically via the hydrodynamic circuit.

The turbine blade arrangement assigned to the drive-side flywheel mass may be rotatable at least to a restricted extent relative to a turbine wheel hub which is in torque-transmitting connection to a transmission input shaft and which is assigned to the transmission-side flywheel mass. In this case, it is preferable for torque to be capable of being transmitted via the gear arrangement between the turbine blade arrangement and the turbine wheel hub. For this purpose, the turbine blade arrangement may have a portion serving as a planet wheel carrier or be coupled or couplable fixedly in terms of rotation to a separate planet wheel carrier. If the turbine blade arrangement is coupled or couplable to a separate planet carrier, the piston of the bridging clutch may serve as the separate planet wheel carrier. The piston may function as a planet wheel carrier, despite the axial displaceability of the piston. Therefore, the toothings of the planet wheel and of the ring wheel or sun wheel and/or a bolt portion of the planet wheel carrier (i.e., the piston) for supporting the respective planet wheel, must be designed with the effect of providing axial displaceability, if appropriate.

In the embodiment in which the turbine blade arrangement is part of the gear-side flywheel mass, the entire turbine wheel, including the turbine blade arrangement, may be assigned to the gear-side flywheel mass. Preferably, torque is then capable of being transmitted via the gear arrangement between the housing and the turbine wheel.

Furthermore, for the hydrodynamic clutch device, it is proposed, in general, that a planet wheel carrier mounted rotatably relative to the turbine wheel and/or to the housing be coupled or couplable in a torque-transmitting manner to the housing. The planet wheel carrier may be couplable in a torque-transmitting manner to the housing by means of the bridging clutch already mentioned, in which case, as already mentioned, a piston of the bridging clutch preferably serves as a planet wheel carrier.

Furthermore, when the present invention is arranged in a hydrodynamic clutch device, the turbine wheel hub may comprise a toothing which serves as a sun wheel. The hydrodynamic clutch device may have a torque transmission path in which the hydrodynamic circuit and the gear arrangement are connected in series.

A torsional vibration absorber mass active in at least one operating state may be integrated into the torque transmission path between the internal combustion engine and the transmission, for example, in the two-mass flywheel and/or the (if appropriate hydrodynamic) clutch device. This torsional vibration absorber mass may be coupled or couplable to the drive-side or the gear-side flywheel mass. Where the hydrodynamic clutch device is concerned, the piston of the bridging clutch may serve, in the disengaged state, as a torsional vibration absorber mass which is coupled in a centrifugally dependent manner, i.e., in dependence on rotational speed, via the gear arrangement to the turbine wheel and consequently to the gear-side flywheel mass.

For the sake of completeness, it should also be mentioned that the gear-side flywheel mass may, further, be assigned an effective rotational mass of the transmission and a rotational mass of a transmission input shaft.

It is proposed, in general, that the first relative rotary angle position lie essentially in the middle of the relative rotary angle range defining the relative rotatability of the flywheel masses or part flywheel masses. It may also be expedient, however, for the first relative rotary angle position to be offset relative to a middle of this relative rotary angle range, preferably in the direction of an overrun direction of rotation of the flywheel mass arrangement.

As already indicated, a spring arrangement may be operatively arranged between the flywheel masses or part flywheel masses and/or gear components of the gear arrangement and participating in the transmission of the torque flow. When the spring arrangement is referred to in the specification, it is intended to embrace not only arrangements consisting of helical compression springs or the like, but also arrangements formed by any desired elastic elements, for example elastomeric elements. Regarding the embodiment arranged in the hydrodynamic clutch device, it is preferred that the spring arrangement be arranged in an inner torus of the clutch device, wherein the inner torus is delimited by the turbine blade arrangement, a pump blade arrangement of a pump wheel and, if appropriate (in the case of a torque converter), a stator blade arrangement of a stator wheel of the hydrodynamic circuit.

The spring arrangement may also be arranged to take effect between gear components of the gear arrangement. For example, the spring arrangement may be arranged to take effect between at least one planet wheel and the planet wheel carrier.

If a spring arrangement is provided, it is preferred that the spring arrangement is connected in parallel to the gear arrangement and transmits part of the torque flow between the internal combustion engine and the transmission (parallel to that part of this torque flow which is transmitted by the gear arrangement). However, it is also possible for the spring arrangement to take effect between gear components of the gear arrangement such that the spring arrangement only contributes to torque transmission by the gear arrangement (and the torque flow is, under some circumstances, transmitted essentially completely via the gear arrangement). For example, the spring arrangement could take effect between at least one planet wheel and a planet wheel carrier and prestress the planet wheel toward a predetermined rotary position of the planet wheel in relation to the planet wheel carrier. Then, in addition to the centrifugally induced forces which act on the planet wheel as a result of the offset between the center of gravity of the additional mass and the axis of rotation of the additional mass, the planet wheel is also acted on by elastic return forces in the direction of said rotary position or in the direction of another rotary position.

The spring arrangement may be arranged for generating an elastic return force which acts on the flywheel mass or part flywheel mass toward a second relative rotary angle position of the two flywheel masses or part flywheel masses which lies between the two relative rotary angle boundary positions and, if appropriate, is offset relative to the first relative rotary angle position. Preferably, the spring arrangement is prestressed in the overrun direction of rotation of the flywheel mass arrangement by the centrifugally dependent return forces; the first relative rotary angle position is therefore preferably offset relative to the second relative rotary angle position in the overrun direction of rotation.

For many arrangements, it would seem that a spring arrangement, as described above, is highly expedient. As already discussed, however, it is also possible to dispense with such a spring arrangement completely and accordingly obtain an effective rigidity of the torque transmission path which is determined by the rotational speed taking effect. For example, gear arrangement may provide an extremely low rigidity at low rotational speeds and a high rigidity sufficient for transmitting the maximum torque of the internal combustion engine at higher rotational speeds. For this purpose, the two flywheel masses or part flywheel masses may be coupled solely via a coupling device which comprises the gear arrangement and which exerts no appreciable elastic return forces on the flywheel masses or part flywheel masses in the direction of a predetermined relative rotary angle position. In this case, the torque flow may be transmitted essentially completely via the gear arrangement.

Another embodiment of the drive train including the two-mass flywheel or the hydrodynamic clutch device, is distinguished in that the gear arrangement has a gear transmission ratio changing with a relative rotary angle of the flywheel masses or part flywheel masses and influencing the radial displacement of the center of gravity and consequently the centrifugally dependent return force. For this purpose, a toothing may be formed between the planet wheel and a sun wheel and/or the ring wheel with a tooth spacing changing continuously along a respective circumference.

The invention relates, furthermore, to a two-mass flywheel for arrangmnt in a motor vehicle drive train between an internal combustion engine and a transmission, comprising a primary flywheel assigned to a driven shaft of the internal combustion engine, a secondary flywheel assigned to an input shaft of the transmission, and a gear arrangement which, in at least one operating state, takes effect between the two flywheels rotatable relative to one another at least to a restricted extent and which, in this operating state, transmits at least part of a torque flow between the internal combustion engine and the transmission. The gear arrangement comprises at least one planet wheel which is coupled to a sun wheel and/or a ring wheel (in particular, in a meshed engagement with the sun wheel and/or the ring wheel) and is rotatable at least to a restricted extent about a planet wheel axis. The planet wheel has at least one rotatable additional mass with a center of gravity offset relative to an axis of rotation assigned to said additional mass. The gear arrangement converts a relative rotation of the two flywheels into a rotation of the additional mass about the axis of rotation assigned to the latter, with the center of gravity being displaced radially in relation to a flywheel axis of rotation.

According to the invention, there is provision for assigning the additional mass to the planet wheel such that a centrifugally induced return force increasing with a rotational speed of the two-mass flywheel and acting on the flywheels occurs in the direction of a first relative rotary angle position of the two flywheels which lies between two relative rotary angle boundary positions delimiting the relative rotary angle range of the two flywheels.

The two-mass flywheel according to the invention, which is provided preferably for a drive train, may be designed according to the above description of the torque transmission path, in particular the gear arrangement and the two-mass flywheel, of the drive train according to the invention. In this case, the primary flywheel may be identified as a part flywheel mass of the drive-side flywheel mass and the secondary flywheel may be identified as a part flywheel mass of the transmission-side flywheel mass.

The invention further relates to a hydrodynamic clutch device such as a hydraulic clutch or a torque converter for arrangement in a motor vehicle drive train between an internal combustion engine and a transmission. The hydrodynamic clutch comprises a housing, a hydrodynamic circuit formed in the housing and having a turbine wheel mounted rotatably in the housing. The hydrodynamic clutch further comprises a gear arrangement which, in at least one operating state of the clutch device, has a torque-transmitting effect in a torque flow path between an input side and an output side of the clutch device. The gear arrangement comprises at least two gear elements moveable relative to one another.

According to the invention, there is provision for the gear arrangement to be assigned at least one additional mass, the center of gravity of which is displaceable radially in relation to an axis of rotation of the clutch device as a function of a relative position of the gear elements. The displacement of the at least one additional mass changes a moment of inertia of the clutch device and/or generates, at least in the operating state, a centrifugally dependent return force which acts between two rotary parts rotatable at least to a restricted extent relative to one another and located in the torque flow path between the input side and the output side, in the direction of the first relative rotary angle position.

Preferably, the first relative rotary angle position lies between two relative rotary angle boundary positions delimiting a relative rotary angle range of the rotary parts. The hydrodynamic clutch device according to the invention, which is provided preferably for a drive train may, furthermore, be designed according to the above description of the torque transmission path, in particular the gear arrangement or the hydrodynamic clutch device, of the drive train according to the invention. In this case, the housing of the clutch device may be identified as a part flywheel mass of the drive-side flywheel mass. According one embodiment, the entire turbine wheel may be identified as a part flywheel mass of the transmission-side flywheel mass. According to another embodiment, the turbine blade arrangement of the turbine wheel and the housing may be identified as a part flywheel mass of the drive-side flywheel mass, while a hub of the turbine wheel may be identified as a part flywheel mass of the transmission-side flywheel mass.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
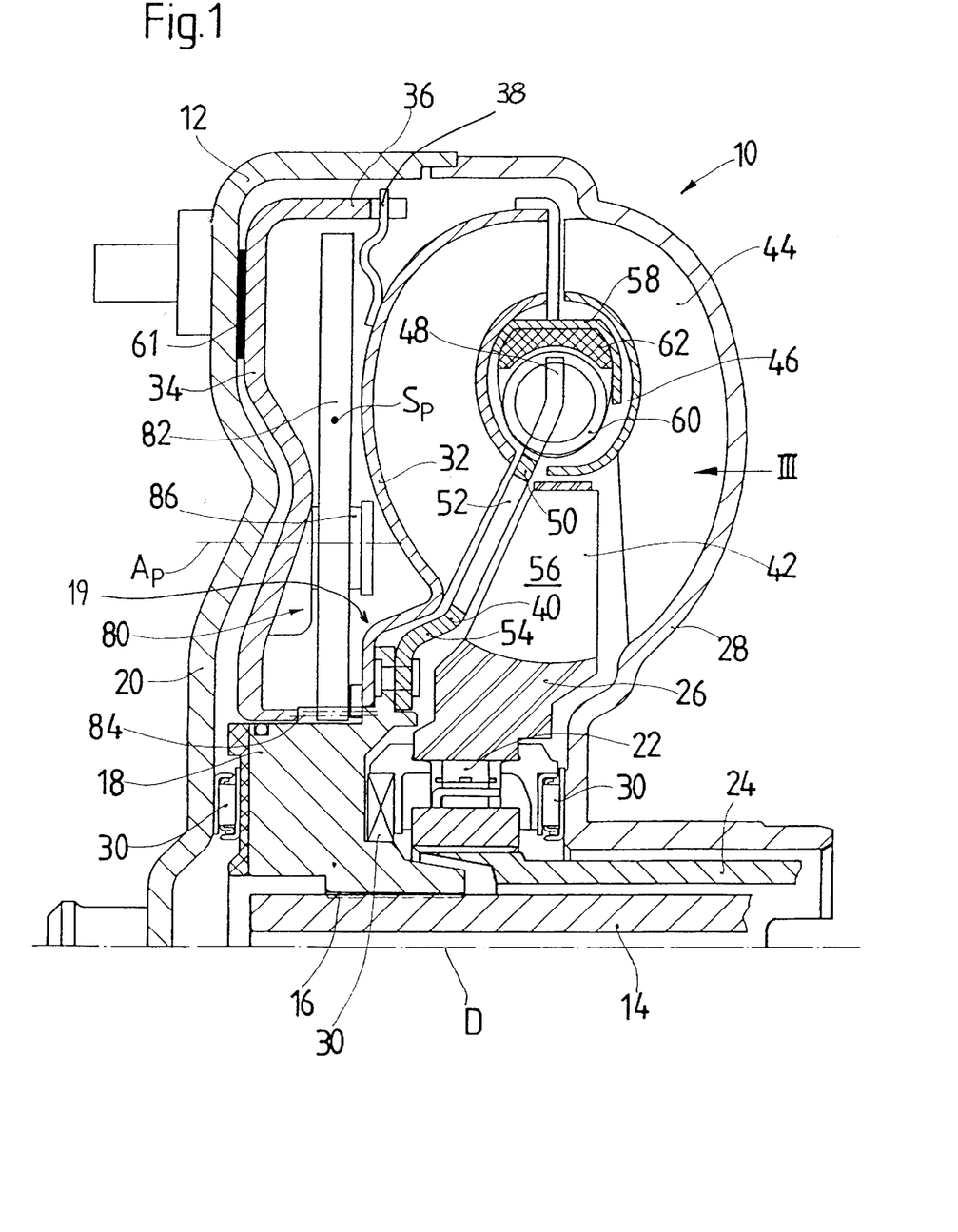
FIG. 1 is a partial sectional view through a torque converter according to a first embodiment of the present invention.

FIG. 1 shows a hydrodynamic clutch device according to an embodiment of the present invention. The hydrodynamic clutch device comprises a torque converter 10 with an input side having a housing 12 which may be coupled in a way known per se, for example, via a so-called "flex-plate", to a driven side of an internal combustion engine (engine). A gear side housing shell, which is part of an impeller wheel 28 having impeller wheel blades 44, is connected to the housing 12 and arranged on an output side of the converter 10. A turbine wheel 19 having a turbine blade arrangement 32 and a turbine wheel hub 18 is arranged between the impeller wheel 28 and the housing 12. An output of the torque converter is formed by a driven shaft 14 which is fixedly secured in terms of rotation to the turbine wheel hub 18 via a toothing 16. The driven shaft 14 may be fixedly connected in terms of rotation to a transmission input shaft. Alternatively, the driven shaft 14 may itself serve as the transmission input shaft. A stator wheel 26 having a stator blade arrangement 42 and supported on a supporting shaft 24 is arranged between the turbine wheel and the impeller wheel 28. An inner-ring-freewheel-outer-ring arrangement 22 is arranged between the stator wheel and the supporting shaft 24. Axial bearings 30 are provided between the turbine wheel hub 18 and a housing shell 20 portion of the housing 12 located on the internal combustion engine side, between the turbine wheel hub 18 and the inner-ring-freewheel-outer-ring arrangement 22 of the stator wheel 26 supported on the supporting shaft 24, and between the gear-side housing shell 28 and the inner-ring-freewheel-outer-ring arrangement 22. The axial bearings 30 allow a relative rotation of the housing 12, of the turbine wheel hub 18 and of the stator wheel 26 relative to one another.

The turbine blade arrangement 32 is mounted rotatably on the turbine wheel hub 18 which is fixedly coupled in terms of rotation to a piston 34 of a bridging clutch of the torque converter 10. The piston 34 is rotatably and axially displaceably mounted on the turbine wheel hub 18. Furthermore, a radially outer flange 36 of the piston 34 is in positive engagement with radially outward-projecting yokes 38 arranged on the turbine blade arrangement 32.

A control disk 40 is mounted fixedly in terms of rotation on the turbine wheel hub 18 and has fingers 48 which project into an inner torus 46 delimited by the turbine blade arrangement 32, the stator blade arrangement 42 and the impeller blade arrangement 44. The radial inner ends of the fingers 48 merge into a ring 50 which are connected via radial webs 52 to a radially inner annular part 54 of the control disk 40. The radially inner annular part 54 of the control disk 40 is secured to the turbine wheel hub 18. Passage orifices are formed between successive radial webs 52 in the circumferential direction. The passage orifices are open in the direction of passage of the converter flow through a hydrodynamic circuit 56 of the torque converter 10.

Yokes 58 are fixed with respect to rotation on the turbine blade arrangement so that they project into the inner torus 46. Springs 60 supported by sliding shoes 62 are arranged in the inner torus 46 to act between the fingers 48 and yokes 58. The sliding shoes 62 guide the springs and are supported via so-called "quills" on control edges formed by either the projecting portions of the yokes 58 of the turbine blade arrangement 32 or by the fingers 48 of the control disk 40. The springs 60 prestress the turbine blade arrangement 32 and the turbine wheel hub 18 toward a predetermined relative rotary angle position.

The arrangement of the springs 60, the control disk 40 and the control edges, comprise a torsional vibration damper which takes effect both in a disengaged state of the bridging clutch (i.e., without frictional engagement between the piston 34 and the housing 12) and in an engaged state of the bridging clutch (i.e., with positive engagement produced via friction linings 61 between the piston 34 and the housing shell 20). When the bridging clutch is in the disengaged state, the piston 34 rotates with the turbine blade arrangement 32 relative to the housing 12 according to a transmission ratio effected by the hydrodynamic circuit. The torque to be transmitted from the input side of the torque converter 10 to the output side is transmitted by the impeller wheel 28 via the hydrodynamic circuit to the turbine blade arrangement 32. In the engaged state, the piston 34 is in friction engagement with the housing shell 20, so that torque is transmitted from the housing 12 via the piston 34 and the yokes 38 directly to the turbine blade arrangement 32 and the hydrodynamic circuit is correspondingly bridged. If slipping frictional engagement between the piston 34 and the housing shell 20 is provided, part of the torque is transmitted directly via the piston 34 and another part of the torque via the hydrodynamic circuit to the turbine blade arrangement 32. The torque transmitted to the turbine blade arrangement 32 is transmitted via the springs 60 of the torsional vibration damper to the control disk 40. From the control disk 40, the torque is transmitted via the turbine hub 18 to the driven shaft 14. Since the connections between the control disk 40 and the turbine wheel hub 18 and between the turbine hub 18 and the driven shaft 14 are fixed with respect to rotation, the design of the springs 60 determines a basic rigidity of the torque transmission path between the input side and output side in the engaged state of the bridging clutch.

Further coupling between the turbine blade arrangement 32 and the turbine wheel hub 18 is provided via a planetary gear 80. The planetary gear 80 is formed by planet wheels 82 and a toothing 84 of the turbine wheel hub 18 serving as a sun wheel. The planet wheels 82 mesh with the toothing 84. Instead of, or in addition to the sun wheel, a ring wheel meshed with the planet wheels 82 may also be used.

The planet wheels 82 are mounted on journal portions 86 of the piston 34 for rotation about a planet wheel axis $A_p$. Accordingly, the piston 34 comprises a planet carrier. The planet wheels 82 each have a moment of inertia in relation to their rotation about their axes $A_p$. The moment of inertia of the planet wheels 82 generates reaction torques effective for counteracting a transmission of fluctuations in synchronization of the internal combustion engine to the transmission in addition to an input-side moment of inertia and an output-side moment of inertia of the torque converter. Reference may be made, in this respect, to paten literature relating to torsional vibrational dampers or two-mass flywheels of the applicant such as, for example, to German reference Nos. DE 44 44 196 A1 and DE 197 26 477 A1.

The planetary gear 80 provides coupling of the turbine blade arrangement 32 and of the turbine hub 18 in addition to the coupling provided by the springs 60 via the reaction forces occurring due to the moment of inertia of the planet wheels 82 in relation to rotation about their axes $A_p$ in the event of fluctuations in a differential rotational speed between the turbine blade arrangement 32 and the planet wheel carrier 34 during rotation of the turbine wheel hub 18 and consequently of the driven shaft 14. In addition to this, coupling between the turbine blade arrangement 32 and of the turbine hub 18 is also achieved in that the planet wheels 82 have a center of gravity $S_p$ displacing radially outward relative to their respective axis of rotation $A_p$. The center of gravity $S_p$ may be displaced outward in that the planet wheels 82 are highly degenerate and, in a side view corresponding to FIG. 3, have an elongate shape. The planet wheels 82 have a toothing 85 which meshes with the toothing 84 arranged only on a toothing circle arc portion selected according to a maximum rotary angle of the planet wheel 82.

Figure 2:
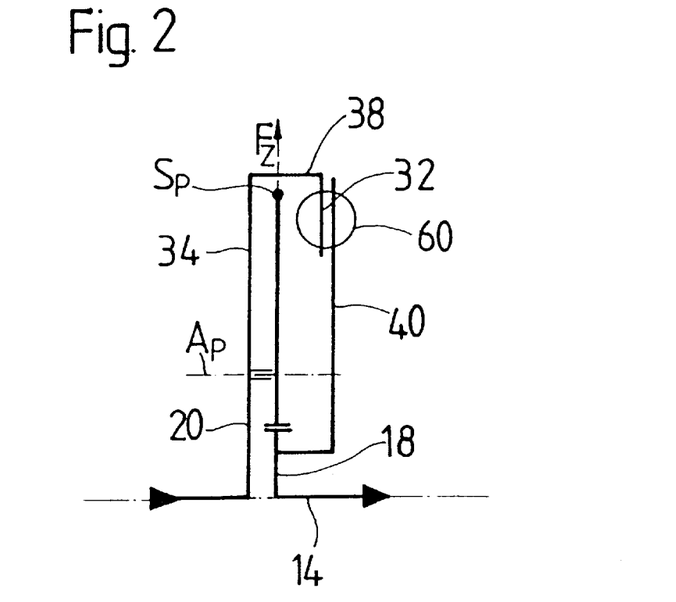
FIG. 2 is an equivalent circuit diagram for the torque converter of FIG. 1 in the case of an engaged bridging clutch bridging a hydrodynamic circuit of the converter.
Figure 3:
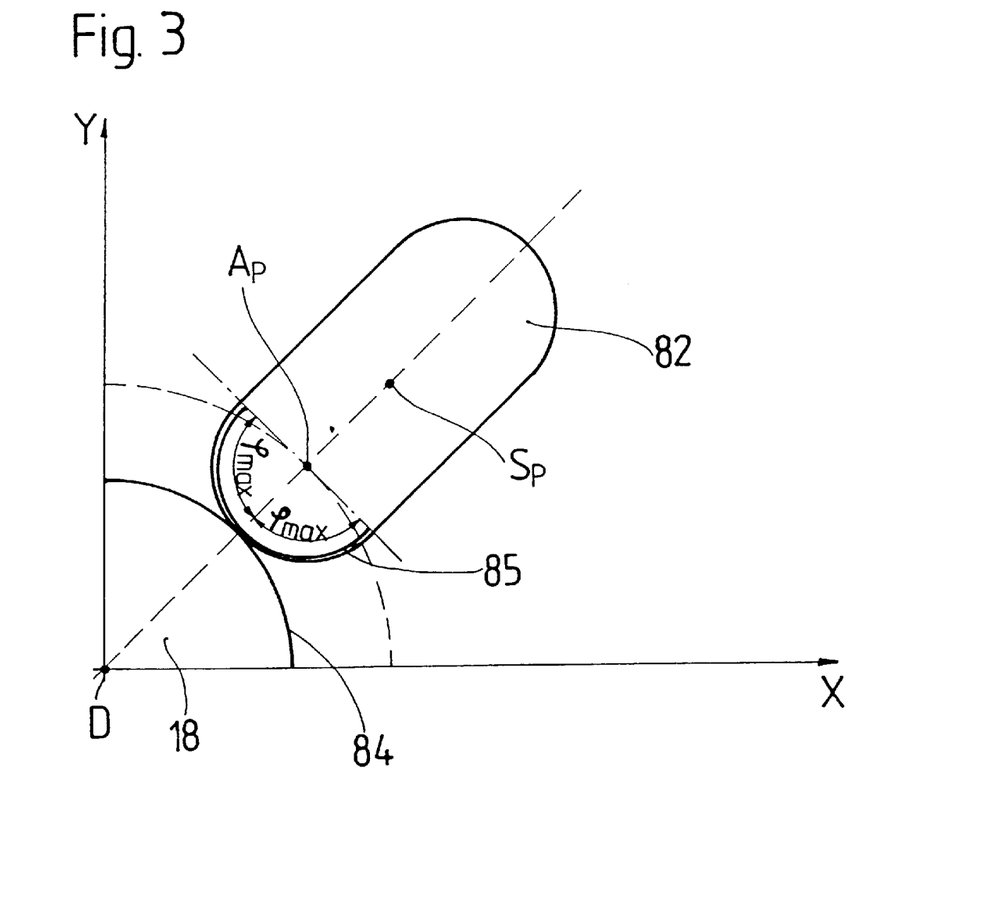
FIG. 3 is a schematic diagram showing a planet wheel of the converter according to FIG. 1 along the direction indicated by arrow III in FIG. 1.

During a rotation of the torque converter 10 about its axis D, a centrifugal force $F_z$ occurs in response to the displacement of the center of gravity $S_p$ radially outward relative to the axis of rotation $A_p$, as illustrated in FIG. 2. The centrifugal force $F_z$ is dependent on rotational speed and acts on the planet wheels 82 in the direction of a rotary position, in which the center of gravity $S_p$ assumes its radially outermost possible position in relation to the axis of rotation D and accordingly intersects a radially extending straight line through the center of gravity $S_p$, the axis of rotation D of the torque converter 10 and the axis of rotation $A_p$ of the planet wheel 82. The planetary gear 80 converts these centrifugal forces $F_z$ into return forces or return moments which act between the planet wheel carrier (i.e., piston) 34 and the sun wheel (i.e., turbine wheel hub) 18 in the direction of a predetermined relative rotary angle position. If it is assumed that a relative rotary angle range which defines rotatability of the turbine wheel hub 18 relative to the turbine blade arrangement 32 or the piston 34 is $2\phi_{max}$—that is to say relative rotation through $\phi_{max}$ is possible from a middle relative rotary angle position in both directions of rotation— then the assignment of the planet wheels 82 to the planet wheel carrier 34 and to the hub 18 may be such that the centrifugally induced return force between the planet wheel carrier 34 and the hub 18 acts in the direction of the middle relative rotary angle position. This situation is illustrated in FIG. 3. The straight line running radially through the center of gravity $S_p$ intersects the axis of rotation D and the axis of rotation $A_p$ exactly in the case where a relative rotary position of the planet wheel carrier 34 and turbine wheel hub 18 corresponds to the middle relative rotary angle position. This middle relative rotary position may correspond exactly to the relative rotary position toward which the elastic return forces exerted by the springs 60 on the turbine blade arrangement 32 (and consequently the planet wheel carrier 34) and the hub 18 are directed. In this case, the centrifugally induced return forces and elastic return forces act together in the direction of the same relative rotary position.

The centrifugally induced contribution to the return forces acting overall achieves a centrifugally dependent return and, correspondingly, an effective rigidity (c-value), centrifugally dependent, that is to say dependent on rotational speed, of the torque transmission path between the input side and the output side of the torque converter 10. As a result, a relatively low c-value, determined primarily by the springs 60, may be achieved at low rotational speeds, for example to make it possible to start the internal combustion engine with as little noise as possible. On the other hand, the centrifugally induced contribution to the return forces, which increases with the rotational speed of the torque converter 10 ensures a rise in rigidity with the rotational speed. Accordingly, a markedly higher rigidity (high c-value) may be achieved, for example so that the maximum torque of the internal combustion engine is covered at high speeds of rotation.

If the planet wheels 82 are designed with sufficiently high masses and with a sufficiently pronounced offset of the center of gravity $S_p$ relative to the axis of rotation $A_p$, the springs 60 may be omitted, so that the entire torque is transmitted via the planetary gear 80 from the turbine blade arrangement 32 or the piston 34 to the tiurbine wheel hub 18.

Figure 4:
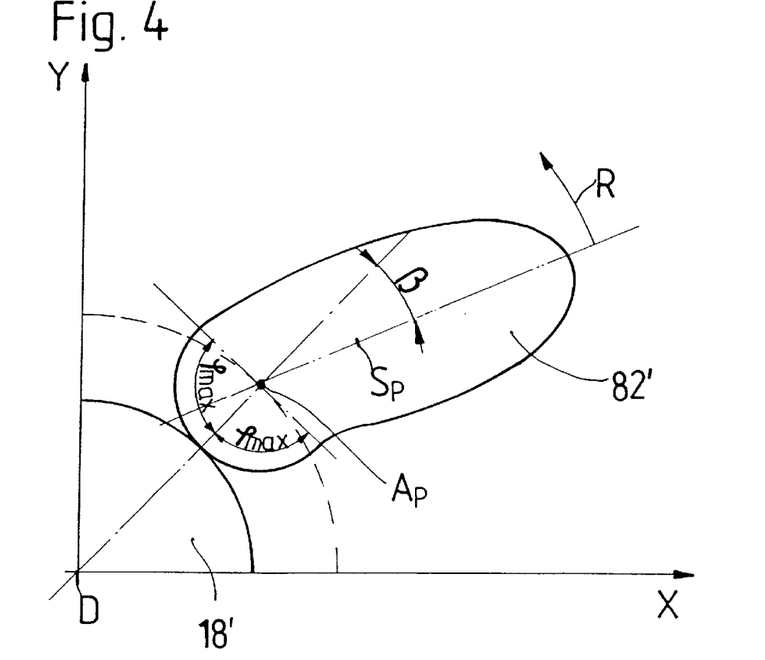
FIG. 4 is a schematic diagram of another embodiment of a planet wheel in the same view as the planet wheel shown in FIG. 3.

FIG. 4 shows another embodiment of the planet wheel 82', in which the planet wheel 82' is designed and assigned to the planet wheel carrier and to the sun wheel 18' such that when the turbine blade arrangement 32 and the hub 18' assume the middle rotary position of the relative rotary angle range, the center of gravity $S_p$ does not lie on a straight line running radially and intersecting the converter axis of rotation D and the planet wheel axis of rotation $A_p$. Instead, the planet wheel 82' is rotated at an angle β to this straight line in relation to the axis of rotation $A_p$ in the middle rotary position. FIG. 4 shows the planet wheel 22' in a rotary position which it will assume when the converter is at zero rotational speed. For rotational speeds of the converter which are unequal to zero, said centrifugal force act on the planet wheel 82' in the direction of the arrow R in FIG. 4—that is, toward the position of the planet wheel in which the center of gravity $S_p$ lies on the straight line intersecting the axes D and $A_p$. If the springs 60 are arranged so that they act in the direction of the middle relative rotary angle position, the converter design of FIG. 4 ensures that the springs 60 connected in parallel to the planet gear 80 are prestressed in one direction in dependence on the rotational speed, so that different overrun and traction characteristics are obtained. The system is preferably prestressed in the overrun direction.

Even without parallel-connected springs 60, the planet wheels 82' of FIG. 4 may be arranged relative to the planet wheel carrier and the sun wheel so that the rotational play up to relative rotary angle boundary positions delimiting the relative rotary angle range is different in the overrun and the traction direction, starting from the relative rotary position toward which the centrifugally induced return forces act (in this rotary position, the center of gravity $S_p$ lies on the radial straight line intersecting the axis of rotation D and the axis of rotation $A_p$).

Figure 5:
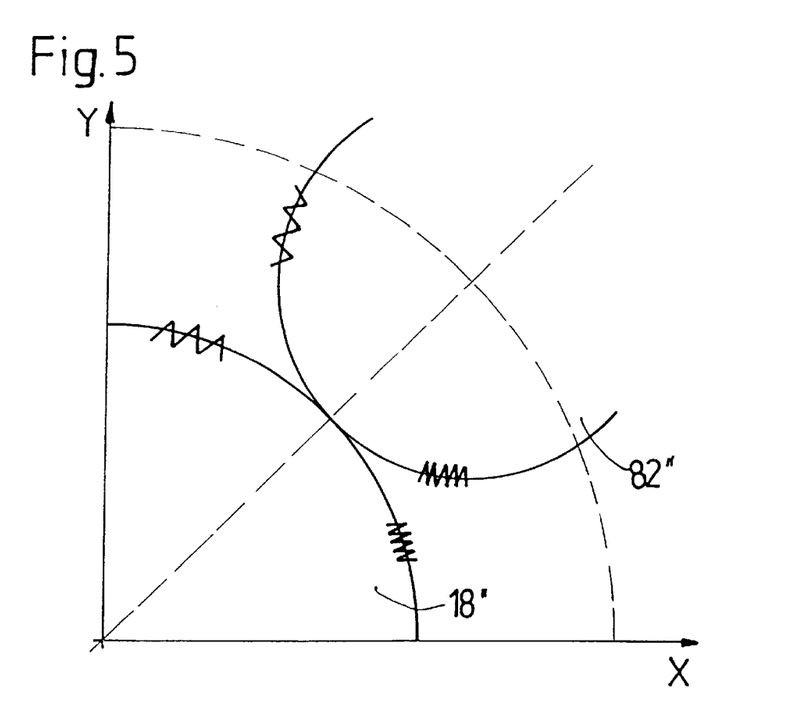
FIG. 5 is a detailed schematic view of the meshed engagement between the planet wheel and a sun wheel.

A further embodiment, which may be implemented in the planet wheel 82 of FIG. 3 and the planet wheel 82' of FIG. 4, is illustrated in FIG. 5. The planet wheel 82" and the sun wheel 18" have toothings with a tooth spacing changing circumferential direction to achieve a change, dependent on rotary angle, in the centrifugal force fraction of the return forces with a corresponding change in the overrun or the traction characteristic. As a result, the centrifugal force fraction may be strengthened for a particular angular position and weakened for other angular positions.

Furthermore, instead of a toothing arranged between the planet wheels and the sun wheel, a frictional engagement may also be used between the respective planet wheel and the sun wheel.

Further details of the torque converter 10 according to FIGS. 1 and 3 may be gathered from the cross section of FIG. 1 without any more detailed explanation. The embodiments of the planet wheels 82' and 82" may also be implemented in the torque converter 10 of FIG. 1. Thus, the piston 34 of the bridging clutch is actuated in a way known per se for engaging and disengaging the bridging clutch, that is to say is displaced axially, specifically by applying a differential fluid pressure on both sides of the piston via the inner space of the converter and fluid ducts running radially and axially.

Figure 6:
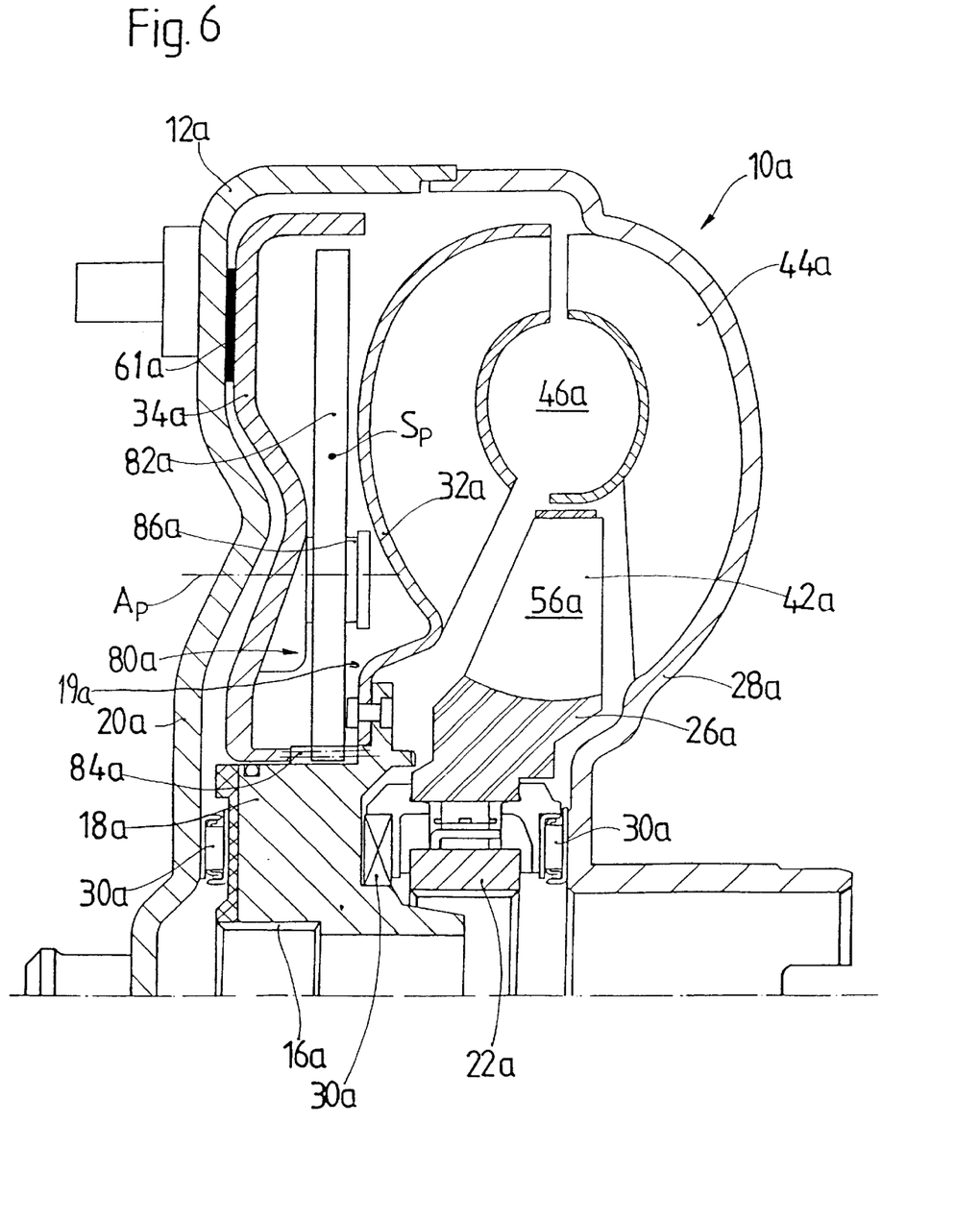
FIG. 6 is a partial sectional view through a torque converter according to another embodiment of the present invention.

A further embodiment of a torque converter 10a according to the invention is shown in FIG. 6. Only the differences in relation to the torque converter 10 of FIG. 1 are explained here, and the same reference symbols, in each case supplemented by the suffix "a" are used for identical or similar components. Reference is made expressly to the above description relating to FIGS. 1 to 5.

An essential difference from the embodiment of FIG. 1 is that, in the converter 10a, the turbine blade arrangement 32a is fastened fixedly in terms of rotation to the turbine wheel hub 18a. In the embodiment of FIG. 1, the turbine blade arrangement 32 and the piston 34 together may be assigned to an input-side inertia mass of the torque converter 10 coupled to the input side (the housing 12) either directly via the bridging clutch or via the hydrodynamic circuit 44. However, in the exemplary embodiment of FIG. 6, the turbine blade arrangement 32a together with the hub 18a is assigned to an output-side inertia mass of the torque converter 10a. The planetary gear 8a in the torque converter 10a of FIG. 6 acts in a torque-transmitting manner in the torque flow path between the input side and output side of the converter only when the bridging clutch is in the engaged stage—when there is frictional engagement between the piston 34a and the housing 12a. When the bridging clutch is in this engaged state, the planet wheels 82a generate, by virtue of the offset of their center of gravity $S_p$ relative to their axis of rotation $A_p$, centrifugally induced return forces between the housing 12a and the turbine wheel 19a including the turbine wheel hub 18a and the turbine wheel blades 32a which increase with the rotational speed of the torque converter 10a. The return forces act in the direction of a relative rotary angle position of the turbine wheel 19a and the housing 12a, the relative rotary position depending on the design of the planet wheel 82a and of the arrangement of the planet wheel 82a to the planet wheel carrier (piston) 34a and to the sun wheel (turbine wheel hub) 18a.

In the exemplary embodiment of FIG. 6, there are no springs or the like connected in parallel to the planetary gear 80a, so that only the centrifugally induced return forces take effect. Accordingly, the rigidity of the torque transmission path between the input side (housing 12a) and output side (driven shaft, omitted in FIG. 6) of the torque converter 10a is determined only by the rotational speed of the torque converter 10a and the design of the planetary gear 80a. However, it is readily possible, even in a design such as that shown in FIG. 6, to provide a spring arrangement which is connected in parallel to the planetary gear 18a and acts, for example, between the piston 34a and the turbine blade arrangement 32a. A spring arrangement may also be arranged in the design of FIG. 6 by integrating a spring element into the planetary gear 18a which exerts an elastic return force via the planetary gear. For example, springs could be provided which are operatively fastened, for example, to radially outer portions of the planet wheels and to the planet wheel carrier 34a.

In the engaged state of the torque converter 10a, torque is transmitted from the housing 12a via the piston (planet wheel carrier) 34a and the planet wheels 82a to the turbine wheel hub 18a and consequently to the driven shaft. In the disengaged state, torque is transmitted from the housing 12a via the hydrodynamic circuit 56a to the turbine blade arrangement 32a and consequently to the hub 18a and the driven shaft. In this embodiment, the planetary gear 18a does not have a torque-transmitting function during the disengaged state of the bridging clutch. Since the piston 34a is freely rotatable relative to the housing 12a when the bridging clutch is in the disengaged state, the piston acts as a vibration absorber mass which is coupled to the output side of the converter 10a via the planetary gear 18a. The coupling of the vibration absorber mass is dependent on rotational speed of the torque converter 10a because of the centrifugal forces which act on the planet wheels 82a. Softer coupling is achieved for low rotational speeds than for higher rotational speeds.

Figure 7:
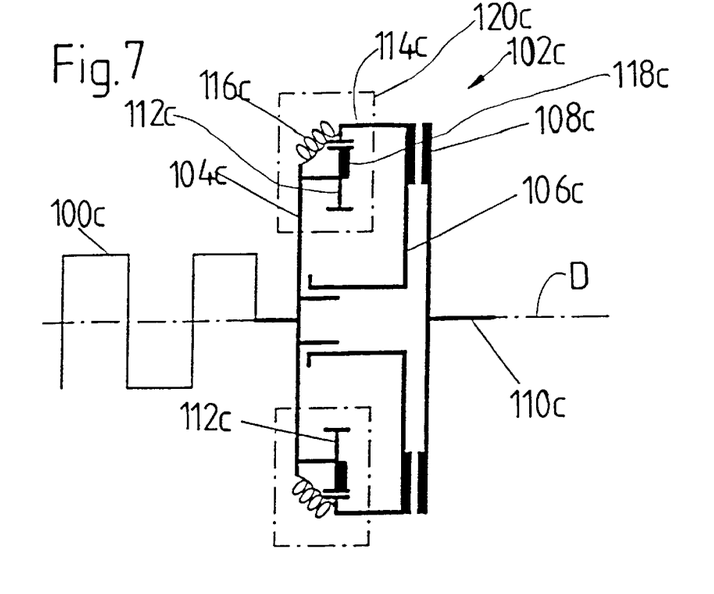
FIG. 7 is an equivalent circuit diagram for a further embodiment of a torque converter according to an embodiment of the present invention.
Figure 8:
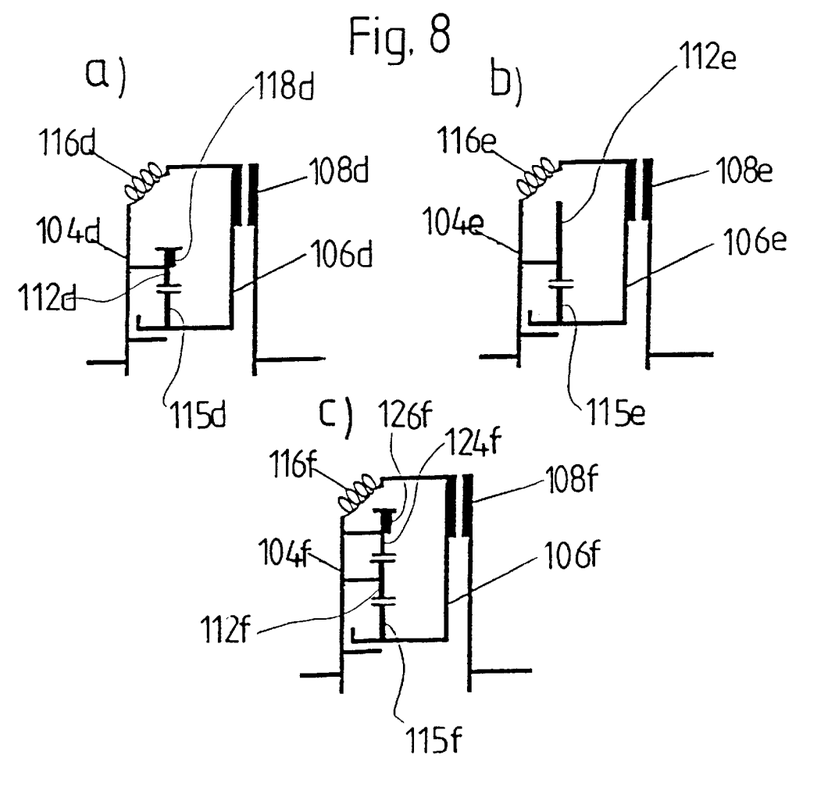
FIG. 8a–8c are equivalent circuit diagrams for further embodiments of torque converters according to embodiments of the present invention.

The present invention may also be used in conjunction with two-mass flywheels. FIG. 7 shows a drive train of a motor vehicle with a crankshaft 100c and a two-mass flywheel 102c having a primary flywheel 104c coupled to the crankshaft 100c and a secondary flywheel 106c which is rotatable to a restricted extent relative to said primary flywheel 104c and which is coupled or couplable to a transmission input shaft 110c via a clutch 108c. The primary flywheel 104c is a planet wheel carrier on which a plurality of planet wheels 112c are mounted for rotation. The planet wheels 112c are in meshed engagement with a ring wheel 114c which is fixedly connected in terms of rotation to the secondary flywheel 106c. The ring wheel 114c may comprise an in integral part of the secondary flywheel 106c. Springs 116c act between the ring wheel 114c and the planet wheel carrier 104c and prestress the two flywheels toward a predetermined relative rotary angle position.

The planet wheels 112c each have a mass accumulation 118c which is displaced radially outward relative to the respective axes of rotation. Therefore, the planet wheels 112c have a center of gravity offset relative to the respective axis of rotation of the planet wheel. The arrangement of the planet wheels 112c in relation to the ring wheel 114c and to the planet wheel carrier 104c is such that the return forces centrifugally induced during a rotation of the two-mass flywheel 102c about its axis of rotation D act between the primary flywheel mass 104c and the secondary flywheel mass 106c and are directed toward a predetermined relative rotary angle position of the two flywheels which lies between two relative rotary angle end positions of the relative rotary angle range defining the rotatability of the flywheels. Thus, in an intermediate position between the two relative rotary angle end positions, which is identical to the predetermined relative rotary angle position the centers of gravity of the planet wheels assume their radially outermost position in relation to the axis of rotation D.

The design of the two-mass flywheel 102c may otherwise correspond to embodiments known per se, for example those of the applicant himself. Thus, for example, an annular grease chamber 120c may be provided, in which grease or the like interacting with the springs 116c and the planet wheels 112c may be contained. Further possibilities for design of the two-mass flywheel 102c of FIG. 7 may be gathered from the details disclosed in German reference DE 197 26 477 A1, with reference to FIG. 1. The planet wheels provided in this known two-mass flywheel likewise have a mass accumulation displaced radially relative to the respective axis of rotation of the planet wheel and, correspondingly, a center of gravity displaced radially relative to the axis of rotation. However, the arrangement of the planet wheels of this known two-mass flywheel to the ring wheel and to the planet wheel carrier is such that the center of gravity of the planet wheels assume their radially outermost position when the two flywheels are deflected to the maximum relative rotation of the flywheels. Therefore, the centrifugally induced forces which increase with the rotational speed of the torque converter assist a rotational deflection of the two flywheels out of a middle position or neutral position between the two relative rotary angle end positions. In the known two-mass flywheel of DE 197 26 477 A1, it is therefore mandatory that springs connected in parallel to the planetary gear act between the two flywheels and must predominate over the centrifugally dependent forces at all the rotational speeds occurring in practice, since the two flywheels would otherwise assume their relative rotary angle end positions, at least at higher rotational speeds, and would as it were come into abutment. The result of this would be that the two flywheels would not, or at most only incompletely, be uncoupled from one another and, at worst, would even act as a unitary flywheel mass. If the design in FIG. 1 of DE 197 26 477 A1 were to be partially adopted to implement the present invention, the plan wheels of FIG. 1 must be arranged, in each case rotated through, for example, 180° about their respective axis of rotation, on the primary flywheel forming the planet wheel carrier, if the intention is to achieve a return of the flywheel masses in the direction of an intermediate position between the relative rotary angle end positions (in the example, in the direction the middle position) by means of the centrifugal forces. In the case of such a return to an intermediate position, according to the invention the springs acting between the flywheels may be dispensed with, if the planet wheels are appropriately designed, while the capacity of the arrangement to function as a two-mass flywheel is maintained. This makes it clear that, despite the fundamental possibility of adopting many design details of the known two-mass flywheel to design a two-mass flywheel according to the present invention, there are substantial differences between a two-mass flywheel according to the present invention and the known two-mass flywheel.

It should also be mentioned that even the basic designs of FIGS. 2 to 8 of German reference DE 197 26 477 A1 may be adopted to design a two-mass flywheel according to the invention. However, under such circumstances, the mass accumulation or additional masses (if appropriate, additional wheels) must in each case be arranged in such a way as to produce a centrifugally dependent return force which acts on the two flywheels in the direction of a relative rotary angle intermediate position between the relative rotary angle end positions delimiting the relative rotary angle range of the flywheels. Some of the existing possibilities, which, like the possibility shown in FIG. 7, may also be applied accordingly to a hydrodynamic clutch device according to the invention, are illustrated in FIGS. 8a, 8b, and 8c. In contrast to FIG. 7, each of the embodiments shown in FIGS. 8a, 8b, and 8c comprises a sun wheel 115d, 115e or 115f which is fixed in terms of rotation to the secondary flywheel 106d, 106e or 106f with a meshed engagement with the planet wheels 112d, 112e or 112f mounted rotatably on the primary flywheel (planet wheel carrier) 104d, 104e or 104f. In FIG. 8a, the planet wheels 112d have a mass accumulation 118d displaced radially relative to the planet wheel axis of rotation as in the example of FIG. 7. In contrast to the planet wheels of FIGS. 1–5, the planet wheels 112d have a circumference lying on a circle and a continuous toothing. The embodiment of FIG. 8b illustrates planet wheel 112e having a "degeneration" according to the planet wheels 82, 82' 82" or 82a of the embodiments of the torque converter 10 and 10a according to FIGS. 1–6. The "degeneration" of the planet wheel 112e leads, in exactly the same way as the mass accumulations 118c and 118d, to a planet wheel center of gravity which is displaced radially relative to the planet wheel axis of rotation.

In the embodiment of FIG. 8c, the planet wheels 112f themselves do not have an eccentric center of gravity. Instead of a mass accumulation or a degeneration of the planet wheels 112f, additional wheels 124f which do have an eccentric center of gravity are mounted rotatably on the planet wheel carrier. The additional wheels 124f mesh with the planet wheels 112f and in each case have a mass accumulation 126f displaced radially relative to a respective axis of rotation of the additional wheel. Within the meaning of the present inventive, the additional wheels 124f must be arranged relative to the planet carrier 104f such that the center of gravity of these additional wheels 124f is displaced radially relative to the axis of rotation of the additional wheel due to the respective mass accumulation 126f and assumes its radially outermost position in relation to the axis of rotation of the two-mass flywheel when the two flywheels are in a relative rotary angle intermediate position between the relative rotary angle end positions.

Figure 9:
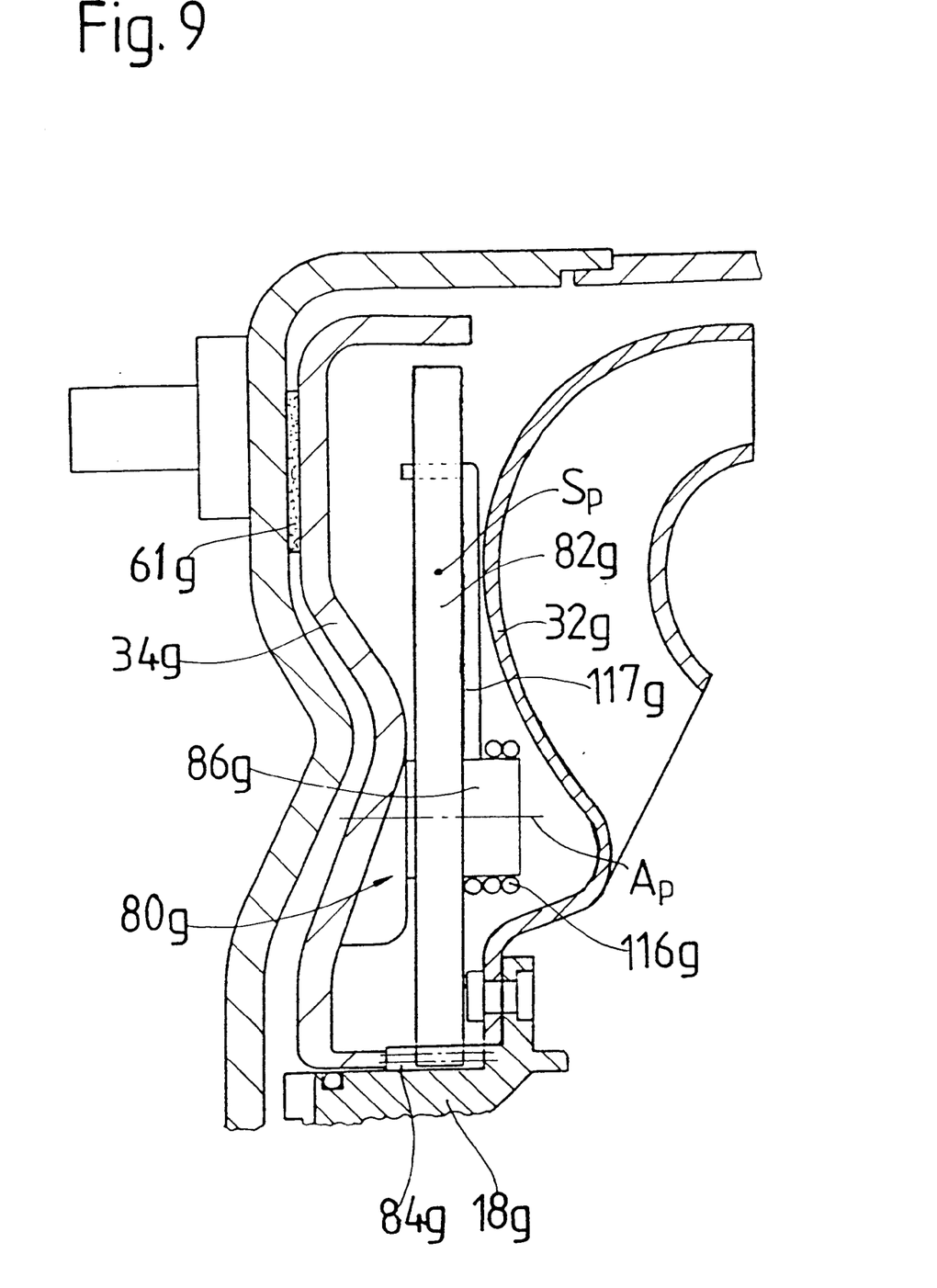
FIG. 9 is a partial sectional view through a torque converter according to yet another embodiment of the present invention.

A further embodiment of a torque converter 10g is shown in FIG. 9. The same reference symbols as in FIG. 6 are used, with the addition of a suffix "g" instead of the suffix "a". Only the changes in relation to the embodiment described above are explained. In this embodiment, the planetary gear 80g includes a helical spring 116g secured to each of the journal portions 86g of the piston (planet wheel carrier) 34g. The helical spring 116g has a spring arm 117g projecting radially in relation to the axis $A_p$. The spring arm 117g is in positive engagement with the respective planet wheel 82g. To accomplish this, a bent-round end portion of the spring arm 117g engages into a passage orifice of the planet wheel 82g. The spring 116g prestresses the planet wheel 82g relative to the planet wheel carrier (piston) 34g in the direction of a predetermined relative rotary position. The meshing engagement between the planet wheel 82g and the turbine wheel hub 18g via the toothings 84g results in an elastic prestress of the piston 34g and of the hub 18g, together with the turbine blade arrangement 32g, into a predetermined relative rotary angle position which lies between the two relative rotary angle boundary positions delimiting the relative rotary angle range. The arrangement may be such that the helical springs 116g act in the direction of the same relative rotary angle position as the centrifugally induced return forces, so that the elastic and the centrifugally induced return forces are always added together and the return of the system is therefore assisted optimally. It is also possible, however, for the elastic return forces and the centrifugally induced return forces to act in the direction of different relative rotary angle positions, as already explained above with regard to the exemplary embodiment of FIG. 1 having the springs 60. The versions there can be transferred readily to the exemplary embodiment of FIG. 9 having a different spring arrangement. It should also be noted, in general, that completely different types of springs may also be used correspondingly such as, for example, leaf springs. Thus, in the embodiment of FIG. 9, the helical spring 116 could be replaced by a leaf spring which likewise acts between the planet wheel carrier and the respective planet wheel. It is also conceivable to provide springs such that these acts between the planet wheel and the turbine wheel hub or turbine blade arrangement.

In conclusion, the invention relates to a drive train of a motor vehicle, in which a gear arrangement, which has at least two gear elements movable relative to one another, acts in a torque transmission path between the internal combustion engine and the transmission between a drive-side flywheel mass and a transmission-side flywheel mass. The gear arrangement includes at least one additional mass having a center of gravity displaceable radially relative to an axis of rotation of the torque transmission path as a function of a relative position of the gear elements. This arrangement allows a moment of inertia of the torque transmission path to change in response to a change in the relative rotary angles between the flywheel masses so that there is no definite resonant point and the torque transmission path takes effect as a selfsteadying system. Furthermore, the additional mass generates a centrifugally dependent return force which acts between two rotary parts which are rotatable at least to a restricted extent relative to one another and located in the torque transmission path. The centrifugally dependent return force acts in the direction of a specific relative rotary angle position lying between two relative rotary angle boundary positions delimiting a relative rotary angle range of the rotary parts. The invention relates, furthermore, to a two-mass flywheel and to a hydrodynamic clutch device for arrangment in a motor vehicle drive train of this type.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive train of a motor vehicle having an internal combustion engine with a driven shaft, a transmission having a transmission input shaft, and a flywheel mass arrangement having a plurality of operating states for transmitting torque between the internal combustion engine and the transmission, said flywheel mass arrangement comprising:

a drive side flywheel mass rotatable about a flywheel mass axis of rotation, said drive side flywheel mass being connected to said driven shaft of said internal combustion engine and comprising a plurality of parts including a drive side part;

a transmission side flywheel mass rotatable about said flywheel mass axis of rotation, said transmission side flywheel mass being connected to said transmission input shaft of said transmission and comprising a plurality of parts including a transmission side part, said drive side part being rotatable relative to said transmission side part at least within a relative rotary angle range about said flywheel mass axis of rotation; and a gear arrangement connected between said transmission side part and said drive side part, said gear arrangement being operable for transmitting at least part of a torque flow between said internal combustion engine and said transmission in at least one of the plural operating states of said flywheel mass arrangement, said gear arrangement comprising a planet wheel and one of a sun wheel and a ring wheel, said planet wheel being rotatably arranged on one of said transmission side part and said drive side part for rotation about a planet wheel axis of rotation parallel to and offset from said flywheel mass axis of rotation, said one of a sun wheel and a ring wheel being fixed with respect to rotation relative to the other one of said transmission side part and said drive side part, said planet wheel being coupled to said one of a sun wheel and a ring wheel and having an additional mass with a center of gravity offset relative to said planet wheel axis of rotation, said gear arrangement operatively arranged for converting a relative rotation between said transmission side part and said drive side part into a rotation of said additional mass, thereby radially displacing said center of gravity relative to said flywheel mass axis of rotation, and said additional mass being arranged on said planet wheel such that a centrifugally induced return force proportional to a rotational speed of said flywheel mass arrangement occurs toward a first relative rotary angle position lying between two end positions of the relative rotary angle range of said transmission side part and said drive side part in said at least one of said plural operating states.

2. The drive train of claim 1, wherein said flywheel mass arrangement comprises a two-mass flywheel arranged in the torque transmission path between said internal combustion engine and said transmission, said drive side flywheel mass comprising a primary flywheel and said transmission side flywheel mass comprising a secondary flywheel.

3. The drive train of claim 2, further comprising frictional surfaces of a friction clutch device assigned to said two-mass flywheel.

4. The drive train of claim 1, wherein said flywheel mass arrangement comprises a hydrodynamic clutch device arranged in the torque flow path between said internal combustion engine and said transmission, said hydrodynamic clutch device comprising a housing and a hydrodynamic circuit formed in said housing, said housing being arranged for rotation with said drive side part and said hydrodynamic circuit comprising a turbine wheel having a turbine blade arrangement connected for rotation with one of said drive side part and said transmission side part.

5. The drive train of claim 4, wherein said turbine wheel further comprises a turbine wheel hub in a torque transmitting connection to said transmission input shaft and connected with respect to rotation to said transmission side mass, said turbine blade arrangement being rotatable relative to said turbine wheel hub within said relative rotary angle range and wherein said gear arrangement is operatively arranged for transmitting a torque between said turbine blade arrangement and said turbine wheel hub.

6. The drive train of claim 5, wherein said planet wheel is rotatably arranged on a portion of said turbine blade arrangement comprising a planet wheel carrier.

7. The drive train of claim 5, wherein said turbine blade arrangement is coupled to a separate planet wheel carrier.

8. The drive train of claim 4, wherein said turbine wheel comprising said turbine blade arrangement is arranged on said transmission side part, said gear arrangement being arranged for transmitting torque between said housing and said turbine wheel.

9. The drive train of claim 4, further comprising a planet wheel carrier mounted for rotation relative to one of said turbine wheel and said housing.

10. The drive train of claim 4, wherein said turbine wheel comprises said sun wheel of said gear arrangement, a toothing being arranged on said sun wheel via which said planet wheel is coupled to said sun wheel.

11. The drive train of claim 1, wherein said first relative rotary angle position lies substantially in a middle of said relative rotary angle range.

12. The drive train of claim 1, wherein said first relative rotary angle position is offset relative to a middle of said relative rotary angle range, in a direction of an overrun of said transmission side part relative to said drive side part.

13. The drive train of claim 1, further comprising a spring arrangement operatively arranged between said drive side part and said transmission side part for transmission of a portion of the torque flow between said internal combustion engine and said transmission.

14. The drive train of claim 4, further comprising a spring arrangement operatively arranged between said drive side part and said transmission side part for transmission of a portion of the torque flow between said internal combustion engine and said transmission, said spring arrangement being arranged in an inner torus of said hydrodynamic clutch device and delimited by said turbine blade arrangement and an impeller blade arrangement of an impeller wheel.

15. The drive train as claimed in claim 13, wherein said spring arrangement is arranged between said planet wheel and a planet wheel carrier arranged on a portion of said drive side part.

16. The drive train of claim 13, wherein said spring arrangement generates an elastic return force urging said drive side part and said transmission side part toward a second relative rotary angle position corresponding to said first relative rotary angle position.

17. The drive train of claim 13, wherein said spring arrangement generates an elastic return force urging said drive'side part and said transmission side part toward a second relative rotary angle position offset relative to said first relative rotary angle position, wherein said offset from said first relative rotary angle position is toward an overrun direction of rotation of said transmission side part relative to said drive side part.

18. The drive train of claim 13, wherein said spring arrangement is connected in parallel to said gear arrangement so the each of said spring arrangement and said gear arrangement transmits a part of said torque flow in said at least one of said plural operating states of said flywheel mass arrangement.

19. The drive train of claim 1, wherein said drive side part and said transmission side part are coupled solely via a coupling device comprising said gear arrangement in said at least one of said plural operating states of said flywheel mass.

20. The drive train of claim 1, wherein an entire portion of said torque flow between said internal combustion engine and said transmission is transmitted essentially via said gear arrangement in said at least one of said plural operating states of said flywheel mass.

21. The drive train of claim 1, wherein said gear arrangement comprises a variable gear transmission ratio between said planet gear and said one of said sun gear and said ring gear which changes with a relative rotary angle of drive side part and said transmission side part, said radial displacement of said center of gravity and said centrifugally dependent return force being dependent on said variable gear transmission ratio.

22. A hydrodynamic clutch device for arrangement in a motor vehicle drive train between an internal combustion engine and a transmission, said hydrodynamic clutch device having a plurality of operating states and comprising:
an input side connected to a plurality of rotary parts including a housing rotatably arranged for rotation about a device axis of rotation;
an output side connected to a plurality of rotary parts and arranged for rotation about said device axis of rotation, said input side being rotatable relative to said output side about said device axis of rotation within a relative rotary angle range;
a hydrodynamic circuit formed within said housing and comprising a turbine wheel rotatably mounted in said housing for rotation about said device axis of rotation;
a gear arrangement arranged between an input rotary part comprising one of said plural parts of said input side and an output rotary part comprising one of said plural parts of said output side of said hydrodynamic clutch for transmitting at least part of a torque flow between said input side and said output side of said hydrodynamic clutch in at least one operating state of said hydrodynamic clutch, said gear arrangement comprising two gear elements moveable relative to one another, one of said two gear elements comprising an additional mass having a center of gravity displaceable radially in relation to said device axis of rotation as a function of a relative position of said two gear elements to change a moment of inertia of said hydrodynamic clutch and to generate a centrifugally dependent return force increasing with rotational speed of the hydrodynamic clutch between said input rotary part and said output rotary part located in the torque flow between the input side and the output side, said return force being toward a first relative rotary angle position.

23. The hydrodynamic clutch device of claim 22, wherein said first relative rotary angle position lies between two relative rotary angle boundary positions delimiting said relative rotary angle range of said input rotary part and said second rotary part.

24. The hydrodynamic clutch device of claim 23, wherein said turbine wheel further comprises a turbine wheel hub connectable via a torque transmitting connection with the transmission input shaft and connected with respect to rotation to said output side, said turbine blade arrangement being rotatable at least within said relative rotary angle range with respect to said turbine wheel hub, and wherein said gear arrangement is operatively arranged for transmitting a torque between said turbine blade arrangement and said turbine wheel hub.

25. The hydrodynamic clutch device of claim 24, wherein one of said gear elements comprises a planet wheel rotatably arranged on a planet wheel carrier arranged on a portion of said turbine blade arrangement.

26. The hydrodynamic clutch device of claim 24, wherein one of said gear elements comprises a planet wheel rotatably arranged on a separate planet wheel carrier, said turbine blade arrangement being coupled to said separate planet wheel carrier.

27. The hydrodynamic clutch device of claim 23, wherein said turbine wheel comprising said turbine blade arrangement is arranged on said output side and said gear arrangement is arranged for transmitting said torque flow between said housing and said turbine wheel.

28. The hydrodynamic clutch device of claim 23, further comprising a planet wheel carrier mounted for rotation relative to one of said turbine wheel and said housing.

29. The hydrodynamic clutch device of claim 23, wherein said two gear elements respectively comprise a planet wheel and a sun wheel, wherein said turbine wheel comprises said sun wheel of said gear arrangement and a toothing is arranged on said sun wheel via which said planet wheel is coupled to said sun wheel.

30. The hydrodynamic clutch device of claim 23, wherein said first relative rotary angle position lies substantially in a middle of said relative rotary angle range.

31. The hydrodynamic clutch device of claim 23, wherein said first relative rotary angle position is offset relative to a middle of said relative rotary angle range, in a direction of an overrun of said output side relative to said input side.

32. The hydrodynamic clutch device of claim 23, further comprising a spring arrangement operatively arranged between said input rotary part and said output rotary part for transmission of said portion of said torque flow between the internal combustion engine and the transmission.

33. The hydrodynamic clutch device of claim 23, further comprising a spring arrangement operatively arranged between said input rotary part and said output rotary part for transmitting said portion of said torque flow between the internal combustion engine and the transmission, said spring arrangement being arranged in an inner torus delimited by said turbine blade arrangement and an impeller blade arrangement of an impeller wheel.

34. The hydrodynamic clutch device of claim 32, wherein said spring arrangement is arranged between said one of said gear elements and a planet wheel carrier arranged on a portion of said input rotary part.

35. The hydrodynamic clutch device of claim 32, wherein said spring arrangement generates an elastic return force urging said input rotary part and said output rotary part toward a second relative rotary angle position corresponding to said first relative rotary angle position.

36. The hydrodynamic clutch device of claim 32, wherein said spring arrangement generates an elastic return force urging said input rotary part and said output rotary part toward a second relative rotary angle position offset relative to said first relative rotary angle position, wherein said offset from said first relative rotary angle position is toward an overrun direction of rotation of said output side relative to said input side.

37. The hydrodynamic clutch device of claim 32, wherein said spring arrangement is connected in parallel to said gear arrangement so the each of said spring arrangement and said gear arrangement transmits a part of said torque flow in said at least one of said plural operating states of said hydrodynamic clutch device.

38. The hydrodynamic clutch device of claim 23, wherein said input rotary part and said output rotary part are coupled solely via a coupling device comprising said gear arrangement in said at least one of said plural operating states of said hydrodynamic clutch device.

39. The hydrodynamic clutch device of claim 23, wherein an entire torque flow between the internal combustion engine and the transmission is transmitted essentially via said gear arrangement in said at least one of said plural operating states of said hydrodynamic clutch device.

40. The hydrodynamic clutch device of claim 23, wherein said gear arrangement comprises a variable gear transmission ratio between said two gear elements which changes with a relative rotary angle of said input rotary part and said output rotary part, said radial displacement of said center of gravity and said centrifugally dependent return force being dependent on said variable gear transmission ratio.

* * * * *